May 2, 1944. R. A. NORBOM 2,348,019
CONTAINER TRANSFER EQUIPMENT FOR VEHICLES
Filed May 28, 1942 4 Sheets-Sheet 1

Inventor
Ragnar A. Norbom
By
Attorney.

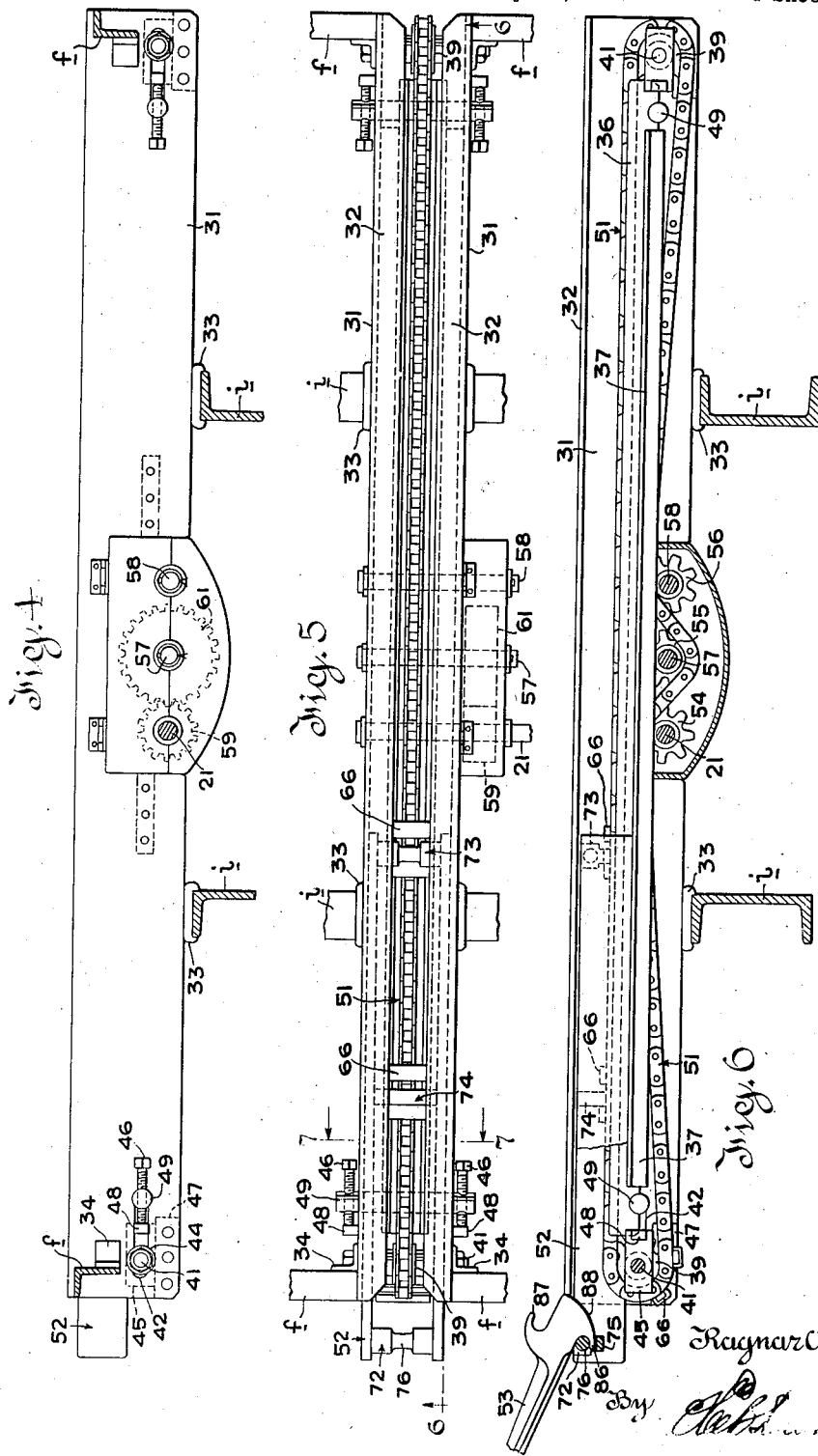

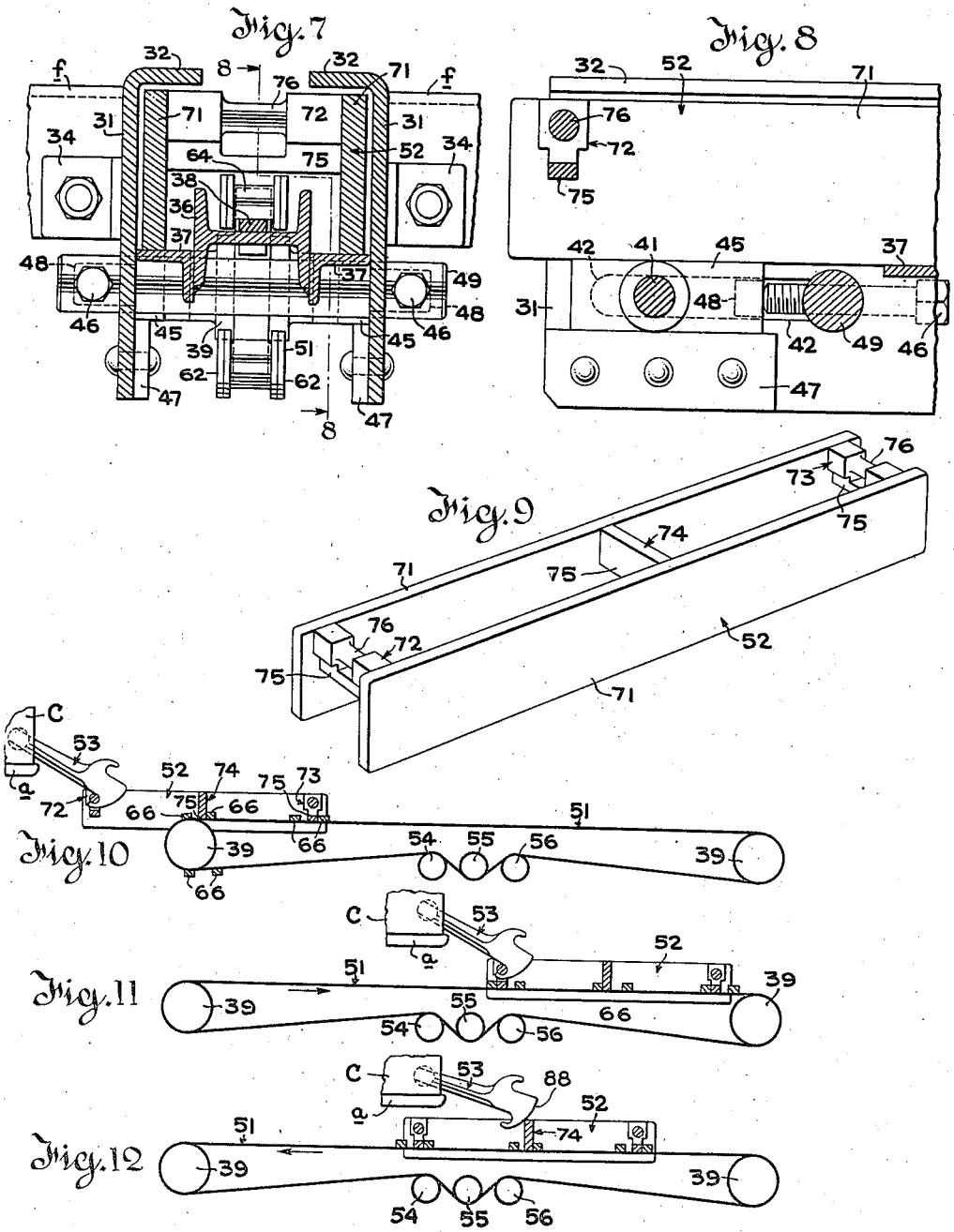

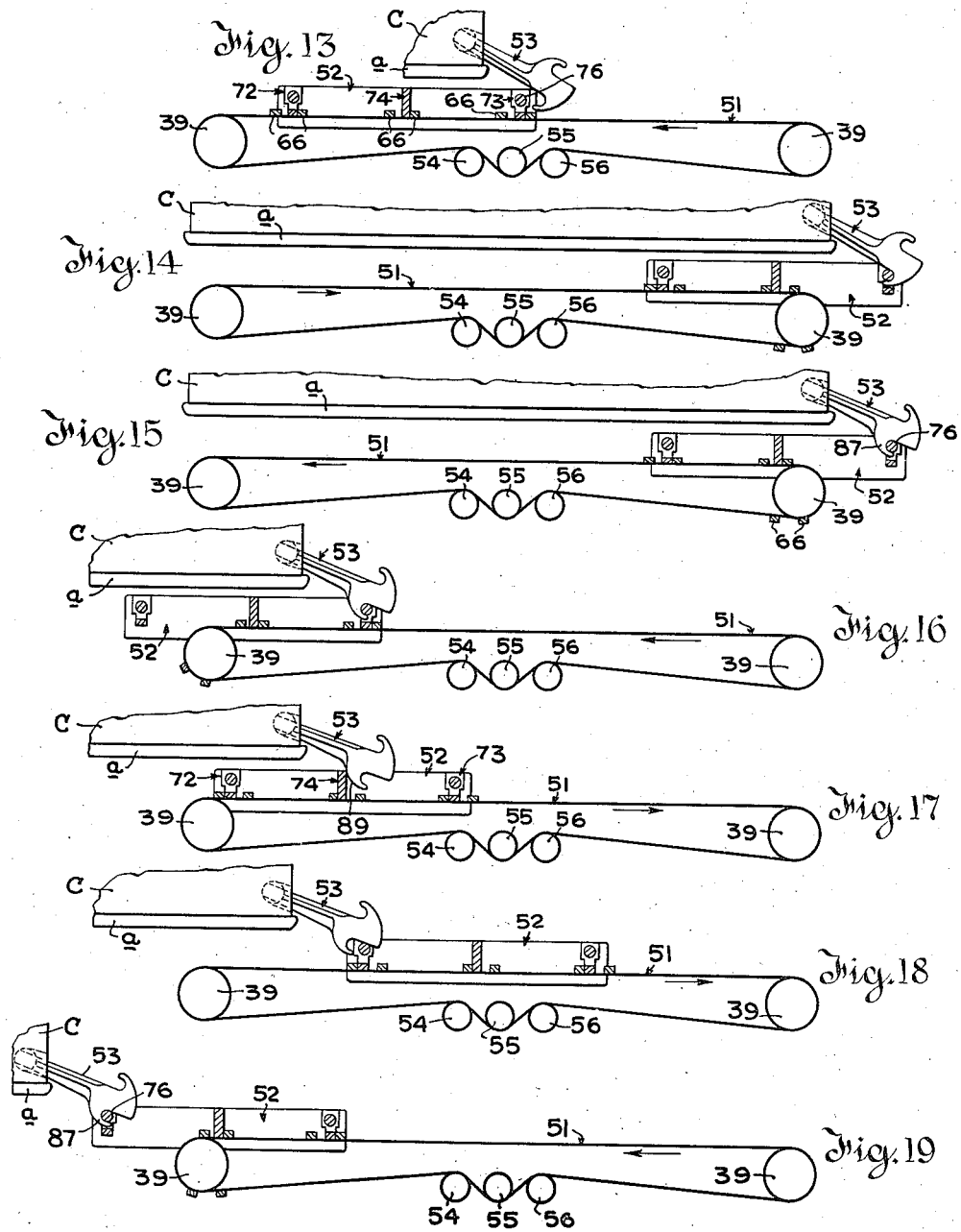

Patented May 2, 1944

2,348,019

UNITED STATES PATENT OFFICE 2,348,019

CONTAINER TRANSFER EQUIPMENT FOR VEHICLES

Ragnar A. Norbom, New York, N. Y., assignor to National Fitch Corporation, a corporation of Delaware Application May 28, 1942, Serial No. 444,929

20 Claims. (Cl. 214—38)

This invention relates to equipment for transferring freight containers to and from vehicles. The equipment is adapted to be mounted in or on the load support, platform, frame or chassis of a vehicle and to transfer freight containers to the vehicle from an adjacent platform or other support at the side of which the vehicle may be parked as well as from the vehicle to an adjacent platform or support. The equipment may be mounted on various types of vehicles, including highway trucks, truck trailers, and railroad cars. A vehicle having the equipment of this invention may be used as a carrier in the hauling of freight containers between a warehouse loading platform and a railroad car or other vehicle, such as a conventional highway truck. A vehicle having the present freight transfer equipment may also be used in passing freight containers between a vehicle not so equipped and a freight car. The freight containers to be transferred by the present equipment may be relatively large in size and may weigh, when loaded, a number of tons. The present equipment has particular usefulness in the transfer of containers for less than a freight car shipment, but of a size to hold as much as a quarter or a half of a freight car load. The freight container may also be of a size and form corresponding to a demountable load carrying body for the truck, trailer or other vehicle having the equipment of this invention.

In a preferred embodiment of this invention, the transfer equipment is normally disposed on a vehicle and within its outer limits, so that no part of the equipment extends beyond the vehicle during its use as a carrier in hauling operations. Yet the equipment in simple manner is adapted to reach beyond a side of the vehicle in shifting a freight container from an adjacent platform to the vehicle, as well as from the vehicle to an adjacent platform. The equipment in a preferred form is also adapted to reach beyond the opposite side of the vehicle in completing a vehicle loading operation so that the freight container being transferred may be properly centered on the vehicle although the container is substantially the same in size as the load support or platform of the vehicle.

It is an object of this invention to provide container transfer equipment which is characterized by its simplicity in construction and operation and by its durability and dependability in service.

It is a further object to provide container transfer equipment which is relatively simple and inexpensive to manufacture.

A further object is to provide freight container transfer equipment for vehicles, which equipment may be readily and properly operated and at the same time requires no special skill or training on the part of the attendant.

Another object is to provide novel transfer equipment the overall dimension of which in hauling operations is not in excess of the width of the vehicle, but which in loading and unloading operations is effective to provide complete transfer of the container to or from the vehicle and from or to an adjacent platform.

A still further object is to provide freight container transfer equipment which requires of its attendant only his control of the power for driving the equipment to complete a loading or unloading operation for the vehicle having such equipment once the equipment is connected to a freight container and placed in operation.

Other objects and advantages of this invention will be readily apparent from the following description, the appended claims, and the accompanying drawings which illustrate a preferred embodiment of the invention.

In the drawings,

Figure 4 is an enlarged detail view taken on line 4—4 of Figure 1 and omitting the push-pull bar.

Figure 5 is a top plan view of the construction shown in Figure 4.

Figure 6 is a view taken on line 6—6 of Figure 5 and showing also a portion of a push-pull bar.

Figure 7 is an enlarged detail view taken on line 7—7 of Figure 5.

Figure 8 is a view taken on line 8—8 of Figure 7 and showing the driven transmitting slide partially retracted for purposes of illustration.

Figure 9 is a perspective view of the drive transmitting slide of Figures 2 through 8. Two of these slides are illustrated in Figure 1.

Figure 1:
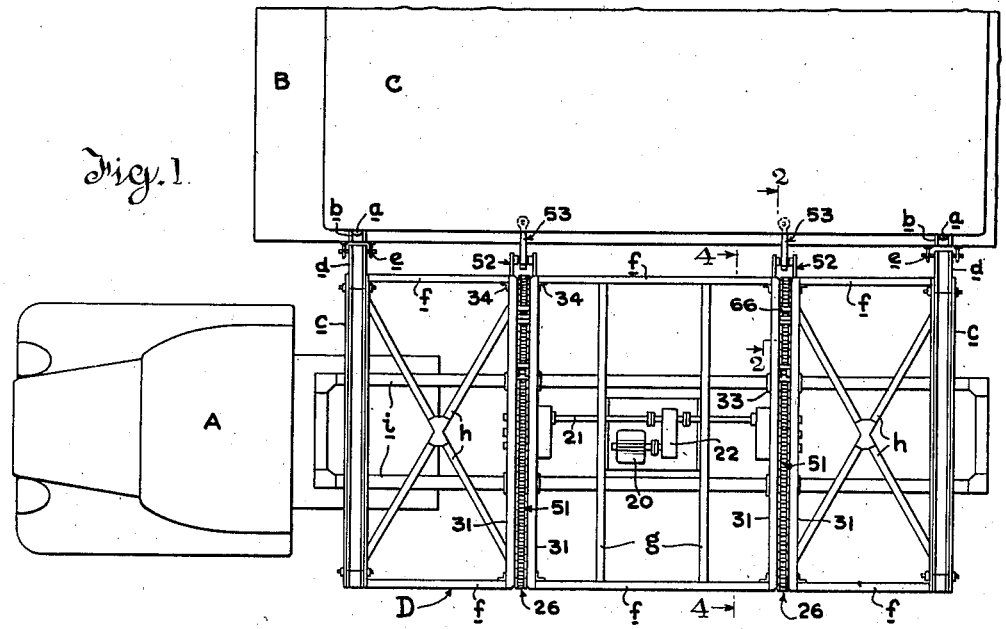
Figure 1 is a plan view of a tractor-trailer type of highway truck provided with transfer equipment embodying this invention. The plan view of Figure 1 also includes a portion of an adjacent railway car and a freight container, the container being on the car and connected to the transfer equipment of the truck.

Figures 10 through 14 are, in general, diagrammatic views to illustrate successive stages during the operation of the equipment of Figures 1 through 9 in transferring a freight container from the railway car to the highway truck of Figure 1.

Figures 15 through 19 are, in general, diagrammatic views to illustrate successive stages during the operation of the equipment of Figures 1 through 9 in unloading a freight container from the highway truck of Figure 1.

Referring now to the accompanying drawings in explaining a preferred embodiment of this invention, Figure 1 shows a vehicle or highway truck A parked adjacent a platform B which supports a merchandise or freight container C. The vehicle A may be of the truck-trailer type as illustrated. The load support of the trailer may be the frame D of the trailer chassis or a load supporting platform of any conventional construction. The platform B may be the platform of a freight or railway car, the loading platform of a warehouse, or the load support or platform of a second truck. The container C may be a demountable trailer body, or a freight car section such as a quarter or half car section, or a warehouse container for holding a substantial quantity of merchandise, such as a truck load. The container C may also be of the open or closed top type. For convenience, the container C will be called a "freight container," the latter term being used generically for containers including the types described above.

The freight container C may be provided with skid rails $a$ which are adapted to slide in and be guided by the channels $b$ on the platform B and the channels $c$ of the trailer as the container C is transferred from the platform B to the trailer or from the trailer to the platform B. The channels $b$ and $c$ may extend transversely of the platform B and the truck trailer frame D, as illustrated, where the transfer operation is to be transverse of the truck A. Where the container C is to be shifted lengthwise of the platform B onto the rear end of the trailer and then lengthwise of the trailer frame D, the channels $b$ and $c$ would be correspondingly arranged on the railway car B and the trailer frame D respectively to facilitate such transfer.

The trailer frame D is provided with members $d$ which serve as bridges between the channels $b$ and $c$ in the transfer of the freight container C. Each bridge member $d$ is of such length that it may extend varying distances beyond the trailer frame D to reach from the frame D to the platform B. The bridge members $d$ may be adjustably secured to the channels $c$ or to the trailer frame D. At their outer ends, the bridge members $d$ are adapted to be secured detachably to folding wings $e$ which are mounted on the side of the platform B. If desired, similar bridge members $d$ may be provided at both ends of each channel $c$ and provide for loading and unloading of the truck A from either of two opposite sides thereof.

When the members $d$ are in their bridging position as illustrated (Figure 1), the channels $b$ and $c$ as well as the members $d$ are in registration or alignment and provide two substantially continuous guides for the container skid rails $a$ during the transfer of the freight container C.

The trailer frame D may be mounted on the main sills $i$ (Figure 1) of the trailer chassis and may comprise longitudinal beams $f$, tranverse beams $g$, and reinforcing members $h$. The beams $f$ form two opposite sides of the frame D, and the channels $c$ are shown as arranged at the front and rear sides of the frame D.

The power for transferring the freight container C onto or off of the trailer frame D is derived from a conventional type of reversible motor 20. The motor 20 drives a shaft 21 through suitable couplings and a conventional reduction gearing 22 (Figure 1). The reduction gearing 22 may include a conventional worm and worm wheel (not shown) for a purpose to be described hereinafter.

The drive of the shaft 21 may be transmitted to the freight container C by means of one or more drive transmitting mechanisms 26, each preferably extending substantially parallel to the channels $c$ on the trailer frame D. In a preferred embodiment of this invention, the trailer frame D is provided with two of the drive transmitting mechanisms 26 as illustrated in Figure 1. These two mechanisms 26 may be and preferably are identical in construction and operation, are similarly mounted, and have similar connections to the driving shaft 21. It will, therefore, be necessary to describe the construction, operation, mounting and drive of only one of the two mechanisms 26.

*Support and mounting for drive transmitting mechanism*

Figure 3:
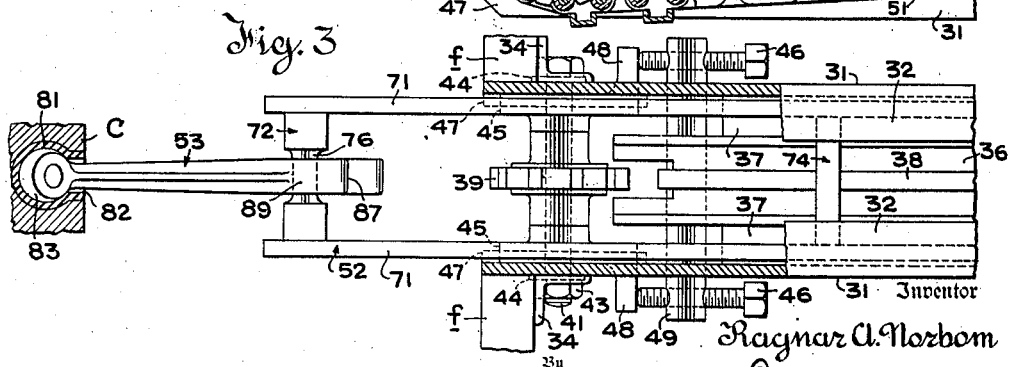
Figure 3 is partly a plan view and partly a horizontal sectional view of the construction shown in Figure 2, the chain of Figure 2 being omitted in Figure 3 for purposes of illustration.

A drive transmitting mechanism 26 is provided with a housing and support comprising a set of two spaced angle beams or angle irons 31 having inwardly extending flanges 32 at their upper edges (see Figures 3 and 7). Each angle beam 31 extends in parallel relation to the trailer channels $c$ and is supported by the main sills $i$ of the trailer chassis (Figures 4 to 6). If desired, suitable pads 33 may be placed between the main sills $i$ and the lower edges of the angle beams 31. The angle beams 31 and the trailer channels $c$ (Figure 1), if desired, may be included in the trailer frame D and provide reinforcement similar to transverse frame members $g$. Each end of the each angle beam 31 may be rigidly secured by means of a bracket 34 to the adjacent end of a frame beam $f$ as shown in Figure 5.

A set of two angle beams 31 supports a chain and slide rest comprising an I-beam 36 and two angle beams 37 (see Figure 7). The I-beam 36 is positioned with its web portion extending in a substantially horizontal position and has each depending flange secured, as by welding, to a flange of an angle beam 37 as shown in Figure 7. The other flange of each beam 37 has its outer edge secured, as by welding, to the adjacent beam 31 as shown in Figure 7. A bar or strap 38 rests on and extends along the length of the web of the I-beam 36 and has its opposite ends turned under the ends of the I-beam web (see Figure 2).

Each end of a set of angle beams 31 is provided with an adjustably mounted sprocket wheel 39. As the sprocket wheels 39 are of the same construction and are similarly mounted and adjusted, it will be sufficient here to describe one of the sprocket wheels 39 and its mounting and adjustment. A sprocket wheel 39 is rotatably mounted on a bolt or axle 41 which extends through a slot 42 in each angle beam 31. The sprocket wheel 39 is adjusted lengthwise of the angle beams 31 by shifting the axle 41 along the slots 42, and is held in adjusted position by tightening the nut 43 to clamp the axle 41 to the beams 31. If desired, the axle 41 may be provided with washers 44.

The sprocket bolt or axle 41 is adjusted by means of two blocks or slides 45 and set screws 46. The blocks 45 are mounted on the axle 41 and serve as spacing means between the sprocket wheel 39 and the upright flanges of the angle beams 31. Each block or slide 45 is guided in its adjusting movement by a plate or bar 47 which may be welded, riveted or otherwise secured to the respective angle beam 31 (see Figures 8, 2, 3 and 7). Each block 45 has a laterally extending lug 48 which projects through the adjacent slot 42 for engagement with the respective adjusting or set screw 46 (see Figures 3, 4 and 5). The two set screws 46 (Figure 3) have threaded engagement with a rigid support, which may be a pin or rod 49 as shown in Figure 3. The pin or rod 49 may extend through the inner end of each of the slots 42 and may be secured in such position as by welding.

Drive transmitting mechanism

A drive transmitting mechanism 26 includes a sprocket chain 51 for driving a slide or arm 52 and a push-pull bar 53. The sprocket chain 51 extends over the two sprocket wheels 39 adjacent the ends of the respective angle beams 31. The lower section or reach of the chain 51 is trained over a sprocket wheel 54, under a sprocket wheel 55, and over a sprocket wheel 56 (see Figure 6). The sprocket wheels 54, 55 and 56 are mounted on shafts 21, 57 and 58, respectively. The shaft 21 is the driving shaft, being driven by the motor 20 as previously described and as illustrated in Figure 1. The sprocket wheel 54 is preferably rotatably mounted on the shaft 21, and a pinion or gear 59 (see Figure 4) is secured fast to the shaft 21. The pinion 59 meshes with a spur gear 61. The spur gear 61 is secured to a hub which is integral with the sprocket wheel 55. The spur gear 61, the sprocket wheel 55 and the connecting hub are rotatably mounted on the shaft 57 which is preferably a stationary shaft. The sprocket wheel 56 is rotatably mounted on the shaft 58, which is also preferably a stationary shaft. The sprocket wheel 55 is, therefore, the driving sprocket for the chain 51 and the sprocket wheels 54 and 56 are idle sprockets for maintaining proper driving relation between the chain 51 and the driving sprocket 55. The chain 51 is maintained taut and in engagement with its sprocket wheels 39, 54, 55 and 56 by proper adjustment of the sprocket wheels 39.

A support and guide for the upper reach of the chain 51 is provided by the I-beam 36 and the bar 38. The upper reach is disposed between the upstanding flanges of the I-beam 36. The bar 38 fits between the links 62, which form the opposite sides of the chain 51, to provide a rest and support for the chain rollers 64. These rollers 64 are carried by pins 63 which pivotally connect the chain links 62. The bar 38 also serves to guide the chain links 62 as well as to space them from the I-beam 36. The chain 51 is also provided with one or more driving lugs 66. A lug 66 may be formed by providing laterally extending wings on two opposite chain links 62 and securing a channel-shaped member to the two chain link wings.

Figure 2:
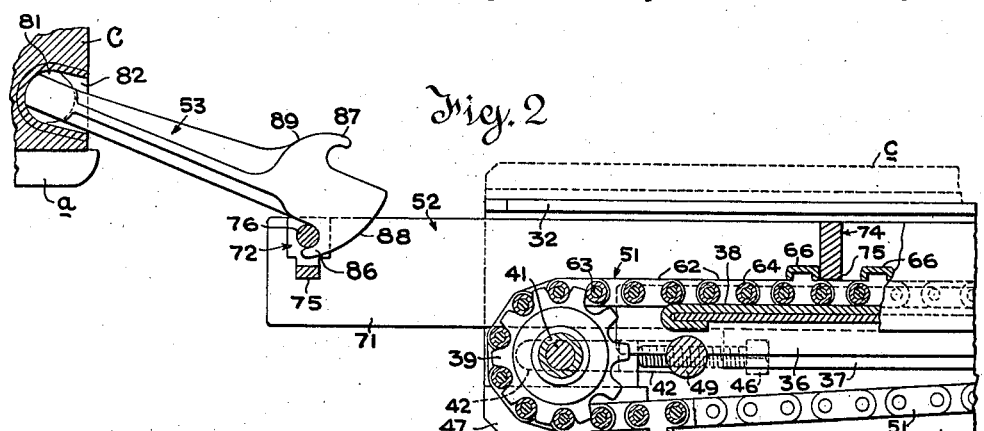
Figure 2 is an enlarged sectional detail view taken on line 2—2 of Figure 1.

The slide or arm 52 (see Figure 9) is adapted to provide a driving connection between its chain 51 and its push-pull bar 53 (Figure 2). The slide 52 is relatively long and may, therefore, be referred to as an elongated member. Its length should be such that when in a central position on the truck, neither end of the slide 52 projects beyond an edge of the vehicle. Where the drive transmitting mechanism operates transversely of a trailer as illustrated in the drawings, it is preferred that the length of the slide 52 be approximately one-half the width of the trailer.

The slide 52 comprises two similar bars or plates 71 which are rigidly secured in assembled and spaced relation as shown in Figure 9 by means of three cross-pieces 72, 73 and 74. These cross-pieces 72, 73 and 74 may be welded to the bars 71. The lower portion 75 of each cross-piece (72, 73 and 74) also serves as a lug which may be driven by a corresponding chain lug 66. The upper portion of each of the cross-pieces 72 and 73 is formed to provide a pin or pin-like element 76 for a purpose to be described. The cross-piece 74 is primarily a reinforcement for the slide 52 and may be omitted if such reinforcement is unnecessary.

In the normal use or operation of a drive transmitting mechanism 26, its slide 52 straddles and is driven by the upper reach of the chain 51. The slide lugs 75 extend across the top of the upper reach of the chain and are in position to be engaged and driven by the chain lugs 66. The slide bars 71 travel at opposite sides of the chain 51. In its operation by the chain 51, the slide 52 is so guided as to travel longitudinally in a substantially rectilinear path between two positions such as are illustrated, for example, by Figures 10 and 14. The slide guide comprises the angle beams 31 and 37, the I-beam 36, and the sprocket adjusting blocks 45. Each bar 71 of the slide 52 travels or slides on the horizontal flange of the corresponding angle bar 37 for the full length of the latter. It will be noted here that the ends of the angle bars 37 are adjacent the screw supporting pins 49 (see Figures 3, 8 and 6). As each slide bar 71 passes beyond its supporting angle bar 37, it slides onto and receives support from the respective sprocket adjusting block 45. Each adjusting block 45 has its upper edge or side level with the upper side of the horizontal flange of the respective angle bar 37. The spacing between each block 45 and the respective angle beam 37 is less than the length of the slide 52.

The push-pull bar 53 is adapted adjacent one end to be detachably connected to the freight container C and adjacent the other end to be detachably connected to the slide 52. The connection of each push-pull bar 53 to the container C may be of the form illustrated and described in the Fitch Patent No. 2,099,684, dated November 23, 1937. The container C is provided with a socket 81, which has a rectangular entrance opening 82 having its larger dimension in the vertical direction. The bar 53 has a flattened spherical head 83 adapted to be passed through the opening 82 into the socket 81. Then, by a quarter turn of the bar 53, its head 83 assumes a position within the socket 81 transversely of the opening 82, and thus is locked to the container C. The socket 81 is preferably of such shape and size as to permit the bar 53 to have limited vertical, pivotal movement relative to the socket 81 for a purpose to be described.

The push-pull bar 53 has two hooks or hook-shaped portions 86, 87, each of which is adapted to receive either of the pins 76 of the slide 52. The hook 86 faces in the general direction of the bar head 83. When the hook 86 engages a slide pin 76, they provide a one-way driving connection between the slide 52 and the bar 53 to permit the slide 52 to pull the bar 53. The hook 87 faces, in general, in the opposite direction to the hook 86. When the hook 87 engages a slide pin 76, they provide a one-way driving connection between the slide 52 and the bar 53 to permit the slide 52 to push the bar 53. The hooks 86 and 87 are preferably positioned at two different sides of the bar 53 and may be placed at opposite sides as illustrated in the drawings (see Figure 2). The end edge 88 of the bar 53 is preferably inclined to the longitudinal axis of the bar 53 and may have the curved form illustrated in Figure 2. This curved edge 88 is in part rearward of the hook 86. The rearward edge 89 of the hook 87 is also preferably inclined to the longitudinal axis of the bar 53 and may have the curved form illustrated in Figure 2. The curved edges 88 and 89 act in the manner of cams for a purpose to be described.

Operation of slide

The slide 52 is adapted to travel normally between two positions. In one position, one end of the slide 52 projects beyond one side or edge of the truck or trailer as shown, for example, in Figure 10. In the other position, the other end of the slide 52 projects beyond the opposite side or edge of the truck or trailer as shown for example in Figure 14. The extent to which the slide 52 projects from the vehicle in either of the two positions is variable to meet the conditions and requirements of individual transfer operations. In either projecting position, the slide 52 is supported by the corresponding sprocket adjusting blocks 45 and tilting of the slide 52 is limited by engagement of the inner end of the slide 52 with the angle beam flanges 32. As the slide 52 travels between the two projecting positions, it slides freely on the sprocket adjusting blocks 45 and the angle beams 37.

The chain 51 may have any desired number of lugs 66 for driving the slide 52 between its two projecting positions. For example, three sets of lugs 66 may be provided as illustrated in the drawings, one set of lugs 66 being provided for each slide lug 75. One lug 66 of each set is adapted to drive the corresponding slide lug 75 in one direction of travel of the chain 51. The other lug 66 of each set is adapted to drive the corresponding slide lug 75 in the opposite direction of travel of the chain 51. The lugs 66 are so spaced that, with the slide 52 in a completely retracted position as shown, for example, in Figure 13 and the upper reach of the chain 51 traveling to the left, the rearward lug 66 of each set engages and drives the respective slide lug 75. With the slide 52 in the same retracted position and the upper reach of the chain 51 traveling to the right, the other lug 66 of each set (now the rearward lug) engages and drives the respective slide lug 75.

As one end of the slide 52 is projected outwardly beyond a vehicle side, the corresponding (or outer) slide lug 75 becomes disengaged from its chain lugs 66. The drive of the slide 52 is now provided by the slide lug or lugs 75 positioned over the chain 51 and the corresponding chain lug or lugs 66. During retraction of the slide 52 from a position in which it projects beyond the vehicle, the lug 75 at the outer end of the slide 52 is reengaged in driving relation by its respective chain lug 66 as shown by Figures 16 and 17, for example.

Container loading operation

In preparing for a container loading operation, the motor 20 is controlled by an attendant to drive the two chains 51 and propel the slides 52 to projected positions adjacent the platform B on which the container C is located. The attendant connects each slide 52 to the container C by means of a push-pull bar 53. The head 83 of each push-pull bar 53 is locked to a socket 81 of the container C. The hook 86 of each push-pull bar 53 is placed in engagement with the pin 76 at the outer or projecting end of the corresponding slide 52. The push-pull bars 53 are now ready to be pulled by their slides 52 (see Figure 2).

The bridges d are secured to the platform B. The platform channels b, the trailer channels c, and the bridges d now provide substantially continuous guides for the container skids a in a container loading operation.

The transfer equipment is now in the adjusted position illustrated in Figures 1 and 10. The attendant operates the motor 20 to drive the upper reach of each chain 51 to the right (looking at Figure 10). The slide lugs 75 over the chain 51 are driven by the corresponding chain lugs 66. The drive of the chains 51 is continued until the slides 52 are completely retracted from their initial projecting positions. The drive of the chains 51 is discontinued when the slides 52 reach, for example, the position illustrated by Figure 11. In traveling between the positions of Figures 10 and 11, the slides 52 pull their push-pull bars 53 to shift the container C partly onto the truck trailer D. As the lug 75 at the rearward side of a slide 52 passes into a position over its chain 51, it is engaged in driving relation by the corresponding chain lug 66.

When the slides 52 are in a retracted position, such as shown in Figure 11, the motor 20 is operated to reverse the direction of travel of the chains 51 (see Figure 12). The slides 52 are thus shifted toward the platform B by their chains 51. This shifting of the slides 52 effects their disengagement from the push-pull bars 53 (see Figure 12). The container C and the push-pull bars 53 thus remain in their advanced position, as the slides 52 are retracted. Each container socket 81 now maintains its push-pull bar 53 so that the bar end 88 is in the path of movement of the upper edge or side of the slide cross-piece 74. The cross-piece 74 slides under the outer end of the push-pull bar 53. The curved bar edge 88 acts in the manner of a cam to engage the cross-piece 74 and raise or swing the push-pull bar 53 and thereby permit the cross-piece 74 to pass under and beyond the outer end of the cross bar 53. The slides 52 continue toward the platform B, until their rearward pins 76 pass under the bar hooks 86. In passing under the hook 86, the rearward slide pin 76 (cross-piece 73) engages the bar edge 88 which rides over the pin 76 in the same manner as the bar edge 88 rides over the slide cross-piece 74. When the rearward pins 76 of the slides 52 have passed the bar hooks 86, the drive of the chains 51 is interrupted and the relation of each slide 52 and its push-pull bar 53 is as illustrated in Figure 13. The chains 51 are now driven in the reverse direction to drive the slides 52 to the right (looking at Figure 13) by controlling the motor 20. As a slide 52 moves to the right, its forward pin 76 (cross-piece 73) engages the corresponding bar hook 86 to provide a one-way driving connection between the slide 52 and the push-pull bar 53. the slides 52 again pull the bars 53 to complete the container transfer operation by shifting the container C from the position of Figure 13 to the position of Figure 14. The right hand end of each slide 52 now projects outwardly of the right hand side of the trailer, and the container C is properly centered on the trailer D (Figure 14).

The container C having been transferred to the trailer D, the push-pull bars 53 are removed and stored at a convenient place on the truck. The slides 52 are retracted to an out-of-the-way position such as illustrated in Figure 13. The bridges d are disconnected from the platform B. The container C is secured in place on the trailer D by any suitable and conventional means. The truck may now proceed to its destination.

Since the gearing 22 includes worm and worm wheel gearing, it provides a self-locking means for the chains 51 and the slides 52 when the motor is not operating.

*Container unloading operation*

The procedure for removing the container C from the trailer D is, in general, similar to the procedure described above for loading the trailer. The bars 53, however, act as push bars in an unloading operation.

In preparing for the unloading of the container C from the trailer D, the bridges d are secured in position as illustrated in Figure 1. The motor 20 is controlled to drive the chains 51 for projecting the slides 52 beyond the vehicle side or edge remote from the platform B. The push-pull bars 53 are connected to the container C and the slides 52 (see Figure 15). Each bar 53 is placed with its hook 87 extending downwardly and engaging the pin 76 at the outer end of its slide 52 (see Figure 15). The transfer or unloading operation is initiated by driving the chains 51 in the direction indicated by the arrow in Figure 15. Each slide 52 is driven to the left and pushes its push-pull bar 53 to shift the container C to the left.

When the push-pull bars 53 arrive at a position over the chains 51, the chain drive is discontinued. The chain drive of the chains 51 may, for example, be interrupted when the transfer operation has reached the stage illustrated by Figure 16. The motor 20 is next controlled to drive the chains 51 in the reverse direction until the slides 52 reach the position of Figure 18. During this reverse drive of the chains 51, the bars 53 and the slides 52 automatically have their driving engagement disconnected, and the container C remains stationary (see Figures 16, 17 and 18). As each slide 52 passes from its position of Figure 16 to the positon of Figure 18, the slide cross-pieces 73, 74 and 72, in the order named, pass under the outer or free end of the corresponding push-pull bar 53. As the cross-pieces 74 and 72 pass under the push-pull bar 53, the bar edge 89 acts as a cam to raise the bar 53 out of the path of the slide 52 in the same manner as described above with respect to the bar end edge 88.

When the slides 52 reach the position of Figure 18, the drive of the chains 51 is again reversed to drive the slides to the left (looking at Figure 19). The forward pin 76 of each slide now engages the hook 87 of its push-pull bar 53 which is then pushed by its slide 52 until the container C is entirely on the platform B and the container unloading operation is completed.

The container unloading operation having been completed, the push-pull bars 53 are removed and stored on the vehicle, the slides 52 are retracted to an out-of-the-way position, and the bridges d are disconnected from the platform B.

The slides 52 may be removed from the chains 51 for inspection, cleaning or other attention. This removal is effected by operating the chains 51 in either direction of the chain drive until the slides 52 pass entirely beyond one end of their guides and fall at the side of the trailer.

While the drawings illustrate each chain 51 as having six lugs 66 or three sets of lugs 66, it will be readily understood that the transfer equipment will operate with a different number of lugs. The lugs 66 which drive the slide cross-piece 74 may be omitted without in any way changing the above-described unloading and loading operations. Each chain 51 may be provided with only one lug 66. In this event a longer time would be required for a complete transfer operation, as the single lug (66) would necessarily travel a distance greater than the length of its chain 51.

It is also obvious that this invention may be practiced with each chain 51 provided with only two lugs 66 for driving the slide cross-piece 74. This arrangement may be used where each slide 52, in an unloading or loading operation, is to project beyond the vehicle sides a distance less than half the length of the slide. Where it is intended that a chain 51 drive only the cross-piece 74 of its slide 52, the lugs 75 of the cross-pieces 72, 73 and the corresponding chain lugs 66 may be omitted.

The foregoing is given by way of illustration, and it is to be understood that this invention includes all modifications and embodiments coming within the scope of the appended claims.

I claim:

1. In freight container transfer equipment for a vehicle, the combination comprising propelling means mounted on the vehicle and having a predetermined limit of reach, an elongated member adapted to be driven in a substantially longitudinal direction by said propelling means along a substantially rectilinear path at least one end of which is beyond the limit of reach of said propelling means, and a bar adapted adjacent one end thereof to be connected to a freight container and adapted adjacent the other end thereof to be detachably connected to said member adjacent either end thereof, connection of said bar to said member adjacent one end thereof being adapted to serve as a driving connection during a portion of a container transfer operation and connection of said bar to said member adjacent the other end thereof being adapted to serve as a driving connection during another portion of said container transfer operation.

2. Equipment as recited in claim 1, wherein guiding means are provided on the vehicle for slidably supporting the elongated member in the longitudinal movement thereof.

3. Equipment as recited in claim 1, wherein the propelling means comprises a chain having one or more lugs thereon, and wherein the elongated member has one or more lugs thereon for driving engagement with said chain lug.

4. Equipment as recited in claim 1, wherein the propelling means comprises a chain, and wherein the elongated member has a lug adjacent each end thereof adapted to be driven by said chain.

5. Equipment as recited in claim 1, wherein the propelling means comprises a chain having at least one lug thereon, and the elongated member is adapted to straddle said chain and is provided with at least one transversely extended lug to overlie said chain in position to be driven by said chain lug.

6. Equipment as recited in claim 1, wherein the bar is adapted to connect the freight container to the elongated member adjacent one end thereof; and the driving means is adapted to be operated in one direction for shifting said container relative to the vehicle, to be then operated in a reverse direction to disconnect said bar from said one end of said member and to position the opposite end of said member adjacent said bar, and to be then driven in said one direction for connecting said bar to said member adjacent said opposite end and for continuing the shifting of said container.

7. Equipment as recited in claim 1, wherein the elongated member has a pin-like part adjacent each end thereof, and the bar has a hook-shaped part for detachable engagement with either of said pin-like parts.

8. Equipment as recited in claim 1, wherein the elongated member has a pin-like part adjacent each end thereof, and the bar has two hook-shoped parts each adapted to engage either of said pin-like parts to provide therewith a one-way driving connection for said bar and said member, one of said hook-shaped parts being adapted to provide a bar pulling connection with either of said pin-like parts, and the other of said hook-shaped parts being adapted to provide a bar pushing connection with either of said pin-like parts.

9. Equipment as recited in claim 1, wherein the elongated member has a pin-like part adjacent each end thereof, and the bar has a hook-shaped part for detachable engagement with either of said pin-like parts to provide a one-way driving connection for said bar and said member, the rearward edge of said hook-shaped part being cam shaped, whereby said bar is adapted to connect the container and one of said pin-like parts, the driving means is adapted to be driven in one direction to drive said member and said bar to shift said container, the driving means is then adapted to be driven in reverse direction to shift said member and thereby disconnect said bar and said one pin-like part, the other of said pin-like parts is adapted to engage said cam shaped bar edge and thereby raise said bar to permit said other pin-like part to pass under said bar, and said driving means is then adapted to be driven in said one direction to effect connection of said hook-shaped bar portion with said other pin-like portion and thereby to continue the shifting of said container.

10. In equipment for transferring freight containers, the equipment being adapted to be mounted on a vehicle and comprising: driving means having one or more lugs thereon, a slidable elongated device having a lug for driving engagement with said first-mentioned lug and having pin-like elements adjacent the opposite ends thereof, and a bar adapted at one end thereof for detachable connection to a freight container and adapted adjacent the other end thereof to engage either of said pin-like elements to provide a one-way driving connection for said bar and said device.

11. In equipment for transferring freight containers to and from a vehicle, the combination comprising a propelling chain mounted on the vehicle, a slide having a pin-like part adjacent each end thereof, a guide on the vehicle for said slide, means providing a separate disengageable driving connection between said chain and each end of said slide, and a bar adapted adjacent one end thereof for detachable connection with either of said pin-like parts and having the other end thereof adapted for detachable connection to a freight container.

12. In equipment for transferring freight containers, the equipment being adapted to be mounted on a vehicle and comprising: an elongated member adapted to be slidably mounted on the vehicle for substantially rectilinear, longitudinal movement between a position in which said member projects outwardly from a side of the vehicle and a position in which said member is arranged inwardly of said vehicle side, means for providing said longitudinal movement of said member, and a bar having one end adapted for connection to a freight container, the other end of said bar rigidly supporting at least one hook-shaped portion for engaging said member to provide a one-way drive connection therebetween, whereby movement of said member in one direction drives said bar through said hook-shaped portion and movement of said member in the reverse direction effects disconnection of said one-way drive connection.

13. For use in equipment on a vehicle to transfer a freight container to and from the vehicle, the combination comprising: a substantially rigid, one-piece push-pull bar having one end thereof adapted for detachable connection to a freight container, the other end of said bar having two hook-like portions, one of said hook-like portions facing in the general direction of said one bar end, the other of said hook-like portions facing substantially in the opposite direction, an arm adapted for slidable mounting on the vehicle and having at least one pin-like element for driving engagement with either of said hook-like portions, and means for driving said arm.

14. For use on equipment on a vehicle to transfer a freight container to and from the vehicle, the combination comprising: a substantially rigid, one-piece push-pull bar having one end edge thereof forming with the longitudinal axis of the bar an angle of less than 90°, to provide a cam-like surface, a hook-shaped portion adjacent one end of said end edge and at one side of said bar, a second side of said bar having at least a portion thereof inclined to the longitudinal axis of said bar, to provide a second cam-like surface, and a hook-shaped portion at said second bar side and positioned between said inclined side portion and said end edge; an arm adapted for slidable mounting on the vehicle and having at least one pin-like element for driving engagement with either of said hook-shaped portions; and means for driving said arm.

15. For use with equipment on a vehicle to transfer a freight container to and from the vehicle, the combination comprising: a rigid, one-piece bar with means adjacent one end thereof for detachable connection to a freight container and having adjacent the other end thereof a hook-shaped portion facing in the general direction of said one bar end, the rearward edge of said bar extending somewhat beyond the hook and presenting a curved cam-like surface, an arm adapted for sliding movement on the vehicle and having a pin-like element adjacent its ends to provide one-way driving connections with said hook-shaped portion of the bar end, and means on the vehicle for moving said arm, the said cam-like surface on the end of the bar being effective to cause the bar end to ride over said pin-like elements when the arm is moved in the direction opposite to that for establishing the driving connection.

16. For use with equipment on a vehicle to transfer a freight container to and from the vehicle, the combination comprising: a rigid, one-piece bar with means adjacent one end thereof for detachable connection to a freight container and having adjacent the other end thereof a hook-shaped portion facing in the general direction of said other bar end, the outer side of said hook-shaped portion presenting a curved, cam-like surface which merges with an adjacent surface of the said bar, an arm adapted for sliding movement on the vehicle and having pin-like elements adjacent its ends to provide one-way driving connections with said hook-shaped portion of the bar end, and means on the vehicle for moving said arm, the said cam-like surface of said hook-shaped portion being effective to cause the bar end to ride over said pin-like elements when the arm is moved in the direction opposite to that for establishing the one-way driving connection.

17. Drive transmitting means for use in transferring freight containers to and from a vehicle having driving means mounted thereon, said drive transmitting means comprising: an elongated member having adjacent at least one end thereof a pin-like element, said member being adapted to be driven longitudinally by the driving means on the vehicle, and a rigid bar adapted at one end thereof for detachable connection to a freight container and having two rigidly supported hook-shaped portions adjacent the other end thereof to engage said pin-like element for providing a one-way driving connection between said bar and said member, one of said hook-shaped portions being operative to effect a one-way pulling connection between the member and container and the other of said hook-shaped portions being operative to establish a pushing connection between the member and container.

18. The combination with a vehicle of equipment for transferring freight containers to and from the vehicle, said equipment comprising an arm, guiding means on the vehicle for slidably receiving said arm, a chain for driving said arm along said guiding means in a substantially rectilinear, longitudinal movement between a position in which one end of said arm extends outwardly from one side of said vehicle and a position in which the other end of said arm extends outwardly from the opposite side of said vehicle, and a bar adapted at one end for detachable connection with said arm adjacent either end thereof, said bar end having two hook-shaped portions, one portion being adapted to engage either end of said arm in a one-way driving connection with said arm pushing said bar, the other portion being adapted to engage either end of said arm in a one-way driving connection with said arm pulling said bar, said bar being adapted at the other end thereof for detachable connection with a freight container.

19. Equipment for mounting on a vehicle to transfer freight containers to and from the vehicle, said equipment comprising: guiding means on the vehicle, a driving chain on the vehicle, an arm slidably received in said guiding means and driven by said chain along said guiding means in a substantially rectilinear, longitudinal movement between a position in which one end of said arm extends outwardly from one side of said vehicle and a position in which the other end of said arm extends outwardly from the opposite side of said vehicle, said arm straddling said chain and having two parts disposed in parallel arrangement and at opposite sides of said chain, said arm having means intermediate its ends and engageable by means on said chain in driving relation, and a bar adapted at one end for detachable connection with a freight container, said arm having adjacent each end thereof and between said two arm parts means each adapted for detachable connection with the second or other end of said bar.

20. In transfer mechanism for moving a freight container to and from a vehicle, said mechanism comprising: an arm mounted for movement in the direction of its length along a rectilinear path from one to the opposite side of the vehicle, means providing a one-way, disengageable driving connection between the trailing end of said arm and a container in initiating a container transfer operation relative to the vehicle and between the leading end of said arm and the container in concluding the container transfer operation, said means including a push-pull bar having its outer end constructed for connection to the container throughout a transfer operation and having its opposite end constructed for disengageable connection with the said arm, means for driving said arm and said push-pull bar to provide a complete container transfer operation relative to the vehicle, said driving means engaging and driving said arm in initiating and concluding the transfer operation to thereby drive said bar and the container forwardly, and means operable at an intermediate stage of the transfer operation to shift said arm relative to the bar in the lengthwise direction of said arm, from a relation in which the inner end of said bar engages the trailing end of said arm to a relation in which said inner bar end is positioned for driving engagement with the opposite end of said arm whereby to complete the transfer operation.

RAGNAR A. NORBOM.